(12) United States Patent
Jiang

(10) Patent No.: US 11,687,180 B2
(45) Date of Patent: Jun. 27, 2023

(54) METHOD FOR TRANSMITTING TOUCH CONTROL DRIVING SIGNAL, TOUCH CONTROL CHIP AND ELECTRONIC DEVICE

(71) Applicant: SHENZHEN GOODIX TECHNOLOGY CO., LTD., Shenzhen (CN)

(72) Inventor: Hong Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 54 days.

(21) Appl. No.: 17/479,863

(22) Filed: Sep. 20, 2021

(65) Prior Publication Data
US 2022/0050545 A1   Feb. 17, 2022

Related U.S. Application Data

(63) Continuation of application No. PCT/CN2020/108522, filed on Aug. 11, 2020.

(51) Int. Cl.
*G06F 3/041* (2006.01)

(52) U.S. Cl.
CPC ........ *G06F 3/0412* (2013.01); *G06F 3/04184* (2019.05)

(58) Field of Classification Search
CPC ........ G06F 3/041–047; G06F 2203/041–4114; G06F 3/0412; G06F 3/04184; G06F 3/0416; G06F 3/044; H01L 27/323
See application file for complete search history.

(56) References Cited

U.S. PATENT DOCUMENTS

| | | | |
|---|---|---|---|
| 9,244,552 B2 | 1/2016 | Liu | |
| 9,436,310 B2 | 9/2016 | Liu | |
| 10,013,131 B2 | 7/2018 | Mizuhashi | |
| 10,437,388 B2 | 10/2019 | Kung | |
| 2011/0267295 A1 | 11/2011 | Noguchi | |
| 2012/0068961 A1* | 3/2012 | Mizuhashi | G09G 3/3655 345/173 |
| 2014/0340349 A1 | 11/2014 | Liu | |
| 2016/0098135 A1 | 4/2016 | Liu | |
| 2016/0342248 A1 | 11/2016 | Ye | |
| 2018/0004345 A1 | 1/2018 | Shin | |

(Continued)

FOREIGN PATENT DOCUMENTS

| | | |
|---|---|---|
| CN | 101008727 A | 8/2007 |
| CN | 101566747 A | 10/2009 |
| CN | 102236487 A | 11/2011 |

(Continued)

*Primary Examiner* — Sanjiv D. Patel

(57) ABSTRACT

A method for transmitting a touch control driving signal, a touch control chip and an electronic device are provided, which could effectively reduce the influence of the touch control driving signal in a touch control screen on a display screen. The method includes: acquiring a pixel update interval of a pixel circuit in a display screen, the pixel update interval being a time interval during which the pixel circuit receives a data driving signal; and generating a touch control driving signal of a touch control screen according to the pixel update interval, part of the touch control driving signal that is located within the pixel update interval being a constant value.

15 Claims, 4 Drawing Sheets

(56) References Cited

U.S. PATENT DOCUMENTS

2018/0284942 A1  10/2018  Kung
2020/0210018 A1  7/2020  Kim

FOREIGN PATENT DOCUMENTS

| | | |
|---|---|---|
| CN | 102411460 A | 4/2012 |
| CN | 103488331 A | 1/2014 |
| CN | 104484077 A | 4/2015 |
| CN | 105741790 A | 7/2016 |
| CN | 108664157 A | 10/2018 |
| CN | 111381721 A | 7/2020 |
| KR | 20190081721 A | 7/2019 |
| TW | I444956 B | 7/2014 |

\* cited by examiner

METHOD FOR TRANSMITTING TOUCH CONTROL DRIVING SIGNAL, TOUCH CONTROL CHIP AND ELECTRONIC DEVICE

CROSS-REFERENCE TO RELATED APPLICATIONS

This application is a continuation of International Application No. PCT/CN2020/108522, filed on Aug. 11, 2020, the disclosure of which is hereby incorporated by reference in its entirety.

TECHNICAL FIELD

Embodiments of the present application relate to the field of touch control, and more particularly, to a method for transmitting a touch control driving signal, a touch control chip and an electronic device.

BACKGROUND

With the development of display screen technology based on an active matrix organic light emitting diode panel (AMOLED), A touch control electrode, that is, a sensing (sensor) electrode, gets closer and closer to a display cathode in a display screen, a signal amplitude of which a touch control driving signal is coupled to the display cathode also gets greater, and the signal is coupled to a driving data line of the display screen through the display cathode of the display screen to form a crosstalk coupling path. In this way, once a driving signal is output on a touch control sensing electrode, the display screen is subject to interference, thereby displaying an interference pattern similar to water ripples, and greatly affecting the user experience.

SUMMARY

Embodiments of the present application provide a method for transmitting a touch control driving signal, a touch control chip and an electronic device, which could effectively reduce the influence of the touch control driving signal in a touch control screen on a display screen.

In a first aspect, a method for transmitting a touch control driving signal is provided, including:

acquiring a pixel update interval of a pixel circuit in a display screen, the pixel update interval being a time interval during which the pixel circuit receives a data driving signal; and generating a touch control driving signal of a touch control screen according to the pixel update interval, part of the touch control driving signal that is located within the pixel update interval being a constant value.

In this embodiment, since a pixel update interval of a pixel circuit in a display screen is easily affected by a touch control driving signal of a touch control screen, the pixel update interval of the pixel circuit in the display screen is considered when the touch control driving signal is generated, so that part of the touch control driving signal that is located within the pixel update interval is a constant value, that is, the touch control driving signal does not flip within the pixel update interval, thereby effectively reducing the influence of the touch control driving signal in the touch control screen on the display screen.

In a possible implementation manner, a flipping time of the touch control driving signal is a start time of the pixel update interval, or an end time of the pixel update interval, or is located within a time interval outside the pixel update interval.

In a possible implementation manner, the generating the touch control driving signal of the touch control screen according to the pixel update interval includes: acquiring a preset driving signal; and generating the touch control driving signal based on the preset driving signal.

In this embodiment, a touch control driving signal is generated based on a preset driving signal, and a touch control driving signal that meets requirements can be obtained by adjusting the preset driving signal according to a pixel update interval.

In a possible implementation manner, the generating the touch control driving signal based on the preset driving signal includes: adjusting a flipping time of the preset driving signal to a start time or an end time of the pixel update interval when the flipping time of the preset driving signal is located within the pixel update interval, so as to obtain the touch control driving signal.

In this embodiment, a flipping time of a preset driving signal is adjusted to a start time or an end time of a pixel update interval when the flipping time of the preset driving signal is located within the pixel update interval, so that a touch control driving signal obtained is a constant value within the pixel update interval, thereby effectively reducing the influence of the touch control driving signal on a display screen.

In a possible implementation manner, a frequency of the touch control driving signal is the same as a frequency of the data driving signal, or a frequency of the touch control driving signal is different from a frequency of the data driving signal, or the touch control driving signal is a spread spectrum signal.

In a possible implementation manner, a frequency of the touch control driving signal is the same as a frequency of the data driving signal, and the generating the touch control driving signal based on the preset driving signal includes: adjusting a phase of the preset driving signal when a flipping time of the preset driving signal is located within the pixel update interval, so as to obtain the touch control driving signal.

In this embodiment, in a case that a frequency of a touch control driving signal is the same as a frequency of a data driving signal, a phase of a preset driving signal can be adjusted when a flipping time of the preset driving signal is located within a pixel update interval, so that a pulse interval of a touch control driving signal obtained does not overlap that of the data driving signal, thereby effectively reducing the influence of the touch control driving signal on a display screen.

In a second aspect, a touch control chip is provided, including:

an acquiring module configured to acquire a pixel update interval of a pixel circuit in a display screen, the pixel update interval being a time interval during which the pixel circuit receives a data driving signal; and a signal generating module configured to generate a touch control driving signal of a touch control screen according to the pixel update interval, part of the touch control driving signal that is located within the pixel update interval being a constant value.

In a possible implementation manner, the signal generating module is specifically configured to: acquire a preset driving signal; and generate the touch control driving signal based on the preset driving signal.

In a possible implementation manner, the signal generating module is specifically configured to: adjust a flipping time of the preset driving signal to a start time or an end time of the pixel update interval when the flipping time of the preset driving signal is located within the pixel update interval, so as to obtain the touch control driving signal.

In a possible implementation manner, a frequency of the touch control driving signal is the same as a frequency of the data driving signal, or a frequency of the touch control driving signal is different from a frequency of the data driving signal, or the touch control driving signal is a spread spectrum signal.

In a possible implementation manner, a frequency of the touch control driving signal is the same as a frequency of the data driving signal, and the signal generating module is specifically configured to: adjust a phase of the preset driving signal when a flipping time of the preset driving signal is located within the pixel update interval, so as to obtain the touch control driving signal.

In a third aspect, an electronic device is provided, including the touch control chip in the second aspect or any one of the possible implementation manners of the second aspect.

DESCRIPTION OF EMBODIMENTS

Technical solutions of the present application will be described hereinafter with reference to accompanying drawings.

A display screen includes a pixel circuit array composed of a plurality of pixel circuits, and the pixel circuits may also be referred to as pixel driving circuits. For a certain row of pixel circuits in the pixel circuit array, a pixel update interval, which is also referred to as a pixel update enable interval, of the row of pixel circuits can be determined according to a horizontal synchronizing signal (denoted as a Hsnyc signal) of the display screen, thereby performing pixel update of the display screen. It should be understood that the pixel update interval of the pixel circuits is a time interval during which a data driving signal (Date Driver) from a data line is written into the pixel circuits. The Hsync signal serves as an output signal of a display standard, and a data driving signal is input to one row of pixel circuits during a period of each Hsync signal for pixel update. It can be considered that one or more segments of the Hsync signal are pixel update intervals, and the relationship between the Hsync signal and the pixel update interval is determined by a driving manner of the display screen, control timing of a display driver integrated circuit (DDIC), and the like.

For a display screen, especially an AMOLED display screen, since the display screen is closer to a touch control screen, a pixel update interval of a pixel circuit is easily subject to interference from a touch control driving signal of the touch control screen, and thus the pixel update interval is also referred to as a display sensitive interval. If the touch control driving signal flips within the pixel update interval, an interference pattern similar to water ripples is present on the display screen, which greatly affects the user experience. Therefore, when the touch control driving signal is generated, if the pixel update interval of the display screen is not considered, interference to a pixel circuit of the display screen is caused.

For this reason, the present application provide a solution for transmitting a touch control driving signal, which could effectively reduce the influence of the touch control driving signal in a touch control screen on a display screen.

Figure 1:
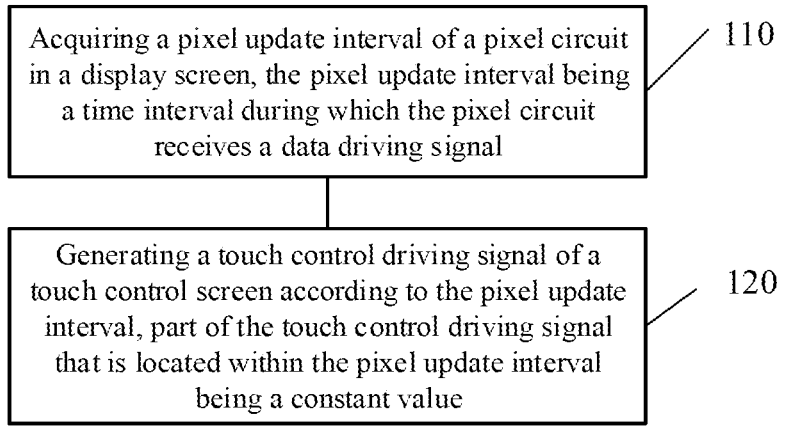
FIG. 1 is a schematic flowchart of a method for transmitting a touch control driving signal according to an embodiment of the present application.

FIG. 1 shows a schematic flowchart of a method for transmitting a control signal according to an embodiment of the present application. The method may be executed, for example, by a touch control chip of a touch control screen. As shown in FIG. 1, the method 100 includes some or all of the following steps.

In step 110, a pixel update interval of a pixel circuit in a display screen is acquired, and the pixel update interval is a time interval during which the pixel circuit receives a data driving signal.

In step 120, a touch control driving signal of a touch control screen is generated according to the pixel update interval, and part of the touch control driving signal that is located within the pixel update interval is a constant value.

In this embodiment, since the pixel update interval of the pixel circuit in the display screen is easily affected by the touch control driving signal of the touch control screen, the pixel update interval of the display screen is considered when the touch control driving signal is generated, so that part of the touch control driving signal that is located within the pixel update interval is a constant value, that is, the touch control driving signal does not flip within the pixel update interval, thereby effectively reducing the influence of the touch control driving signal in the touch control screen on the pixel circuit of the display screen.

If the touch control driving signal flips within the pixel update interval, interference to the pixel circuit is caused. Therefore, when the touch control driving signal is generated, a flipping time thereof needs to avoid the pixel update interval. For example, the flipping time of the touch control driving signal may be moved to a start time or an end time of the pixel update interval; or the flipping time of the touch control driving signal may be moved to a time interval outside the pixel update interval.

A waveform and frequency of the touch control driving signal in the touch control screen is not limited in the embodiments of the present application. Generally, a rectangular wave may be adopted for the touch control driving signal. The frequency of the touch control driving signal may be either the same as a frequency of the data driving signal received by the pixel circuit, or different from a frequency of the data driving signal received by the pixel circuit; or the frequency of the touch control driving signal may also constantly change, for example, the touch control driving signal is a spread spectrum signal.

Generally, the frequency of the data driving signal input to the pixel circuit through a data line is the same as that of a horizontal synchronizing signal of the display screen.

Therefore, in other words, the frequency of the touch control driving signal may be the same as or different from the frequency of the horizontal synchronizing signal of the display screen.

How to generate the touch control driving signal is also not limited in the embodiments of the present application. For example, the touch control driving signal whose flipping time is not located within the pixel update interval can be directly generated according to the pixel update interval. For another example, in step 120, the generating the touch control driving signal of the touch control screen may include: acquiring a preset driving signal, and generating the touch control driving signal based on the preset driving signal.

The preset driving signal may be, for example, a touch control driving signal set according to requirements for touch control detection of a touch screen without consideration of the pixel update interval of the display screen. The touch control chip may first generate the preset driving signal, and then appropriately adjust parameters such as a flipping time or phase of the preset driving signal, so as to obtain the touch control driving signal.

Figure 2:
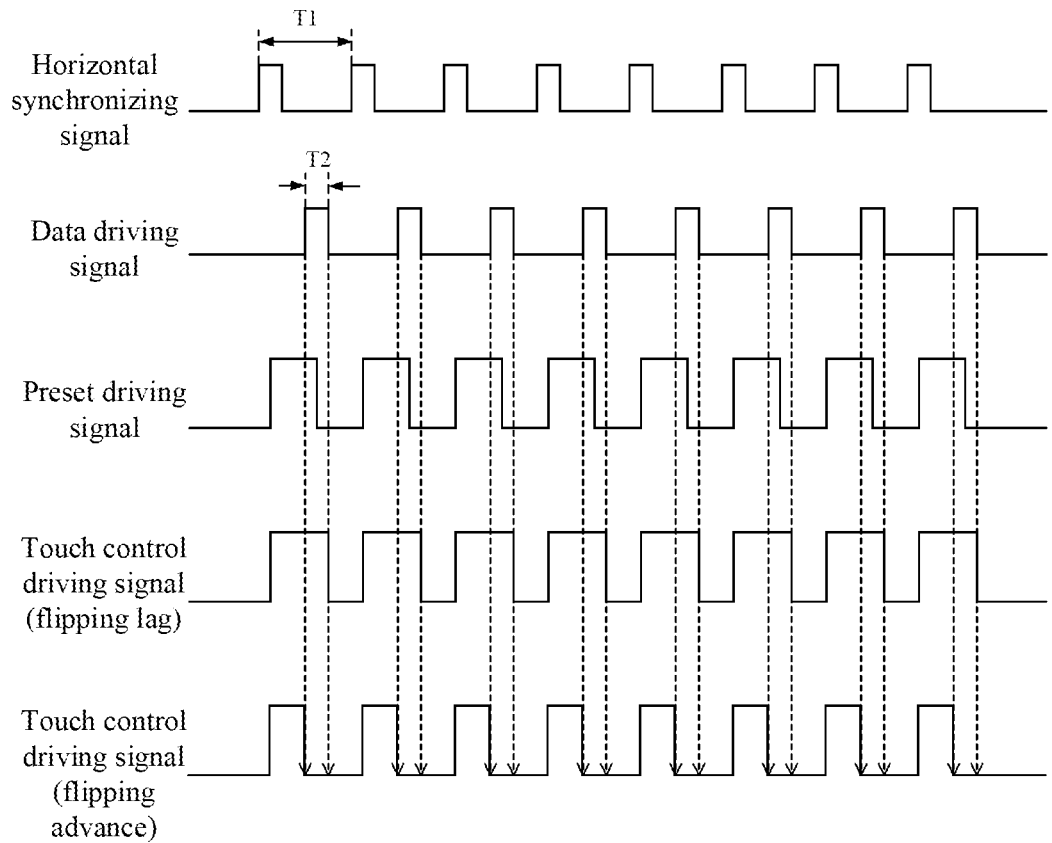
FIG. 2 is a schematic diagram of a touch control driving signal when the touch control driving signal and a data driving signal have a same frequency.

In a case that the frequency of the touch control driving signal is the same as the frequency of the data driving signal, in an example of FIG. 2, a horizontal synchronizing signal is shown in the 1st row, and one row of pixel circuits of the display screen is driven during one period T1 of the horizontal synchronizing signal, so that data of the row of pixel circuits is updated. The data driving signal is shown in the 2nd row. In a case that the row of pixel circuits is turned on, each pixel circuit in this row receives the data driving signal simultaneously, and the data driving signal is used to drive a data line, so as to apply a voltage signal to each pixel circuit in this row. A period of time during which the voltage signal on the Date Line is written into the pixel driving circuits is a pixel update interval. It should be understood that one pixel update interval T2 in FIG. 2 is a pixel update interval of one row of pixel circuits.

As shown in FIG. 2, a preset driving signal is shown in the 3rd row, and a frequency of the preset driving signal is the same as that of the data driving signal. However, a flipping time of the preset driving signal is located within the pixel update interval, and thus the influence on data update of the pixel circuits is caused. For this reason, when the flipping time of the preset driving signal is located within the pixel update interval, the flipping time of the preset driving signal can be adjusted to a start time or an end time of the pixel update interval to obtain the touch control driving signal.

The touch control driving signals output by the touch control chip are shown in the 4th and 5th row of FIG. 2, where the flipping time of the preset driving signal that is within the pixel update interval is adjusted to an end time of the pixel update interval T2, and the touch control driving signal shown in the 4th row can be obtained, which is equivalent to increase of a duty cycle of the touch control driving signal; and the flipping time of the preset driving signal that is within the pixel update interval is adjusted to a start time of the pixel update interval T2, and the touch control driving signal shown in the 5th row can be obtained, which is equivalent to reduction of a duty cycle of the touch control driving signal.

It can be seen that the touch control driving signals obtained in those manners are constant values within the pixel update interval T2, so that no interference to the pixel circuits is caused.

Figure 3:
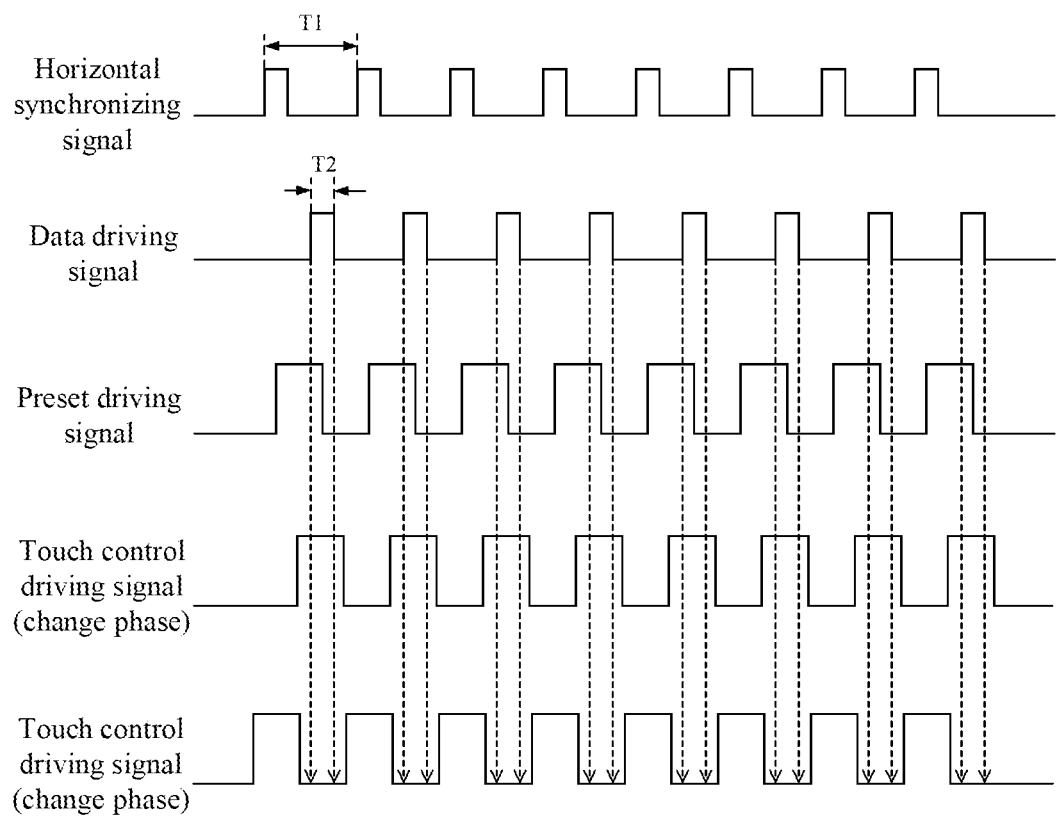
FIG. 3 is a schematic diagram of a touch control driving signal when the touch control driving signal and a data driving signal have a same frequency.

In addition to the adjustment of the flipping time of the preset driving signal, in a case that the frequency of the touch control driving signal is the same as the frequency of the data driving signal, as shown in FIG. 3, when the flipping time of the preset driving signal is located within the pixel update interval, a phase of the preset driving signal can be adjusted to obtain the touch control driving signal. As shown in the 4th and 5th rows of FIG. 3, after the phase of the preset driving signal is adjusted, the obtained touch control driving signals are constant values within the pixel update interval T2, so that no interference to the pixel circuits is caused.

Figure 4:
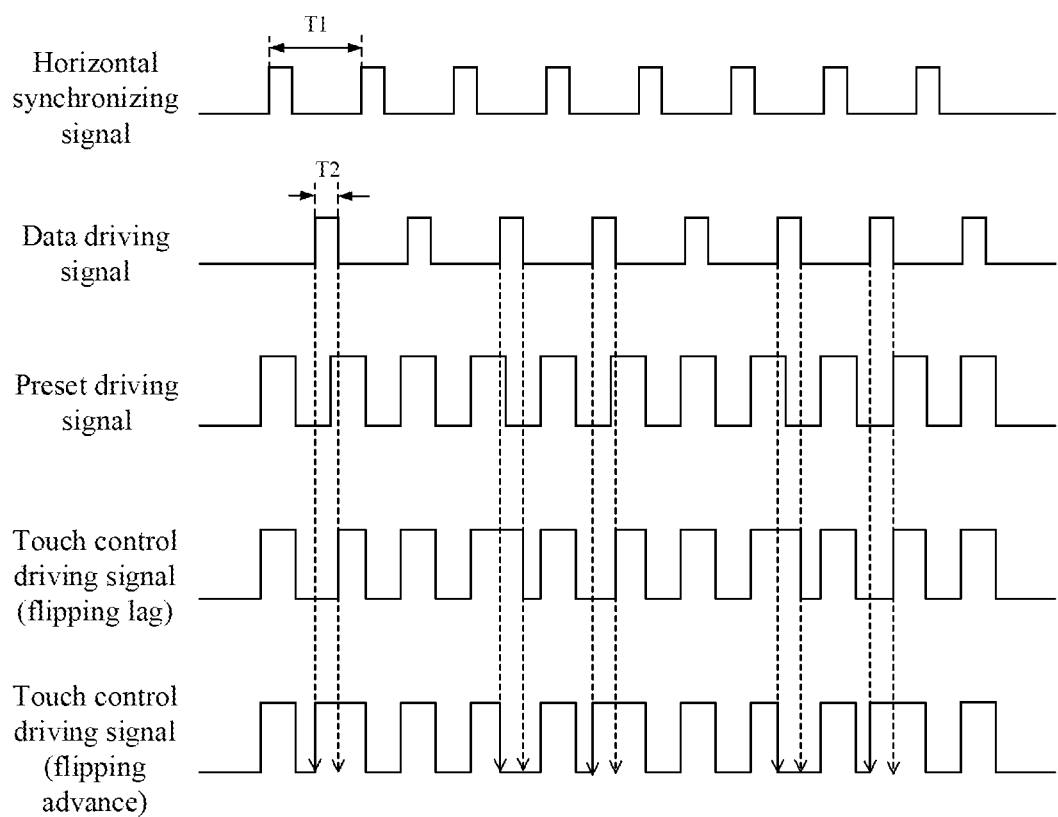
FIG. 4 is a schematic diagram of a touch control driving signal when the touch control driving signal and a data driving signal have different frequencies.

In a case that the frequency of the touch control driving signal is different from the frequency of the data driving signal, in an example of FIG. 4, a horizontal synchronizing signal is shown in the 1st row, and one row of pixel circuits of the display screen is driven during one period T1 of the horizontal synchronizing signal, so that data of the row of pixel circuits is updated. The data driving signal is shown in the 2nd row. In a case that the row of pixel circuits is turned on, each pixel circuit in this row receives the data driving signal simultaneously, and the data driving signal is used to drive a data line, so as to apply a voltage signal to each pixel circuit in this row. A period of time during which the voltage signal on the date line is written into the pixel driving circuits is a pixel update interval. The data driving signal may also be referred to as a Data Line signal. It should be understood that one pixel update interval T2 in FIG. 4 is a pixel update interval of one row of pixel circuits.

As shown in FIG. 4, a preset driving signal is shown in the 3rd row, a frequency of the preset driving signal is different from that of the data driving signal, and a flipping time of the preset driving signal is located within the pixel update interval, and thus the influence on data update of the pixel circuits is caused. For this reason, when the flipping time of the preset driving signal is located within the pixel update interval, the flipping time of the preset driving signal can be adjusted to a start time or an end time of the pixel update interval to obtain the touch control driving signal.

The touch control driving signals output by the touch control chip are shown in the 4th and 5th row of FIG. 4, where the flipping time of the preset driving signal that is within the pixel update interval is adjusted to an end time of the pixel update interval T2, and the touch control driving signal shown in the 4th row can be obtained; and the flipping time of the preset driving signal that is within the pixel update interval is adjusted to a start time of the pixel update interval T2, and the touch control driving signal shown in the 5th row can be obtained.

It can be seen that the touch control driving signals obtained in those manners are constant values within the pixel update interval T2, so that no interference to the pixel circuits is caused.

Figure 5:
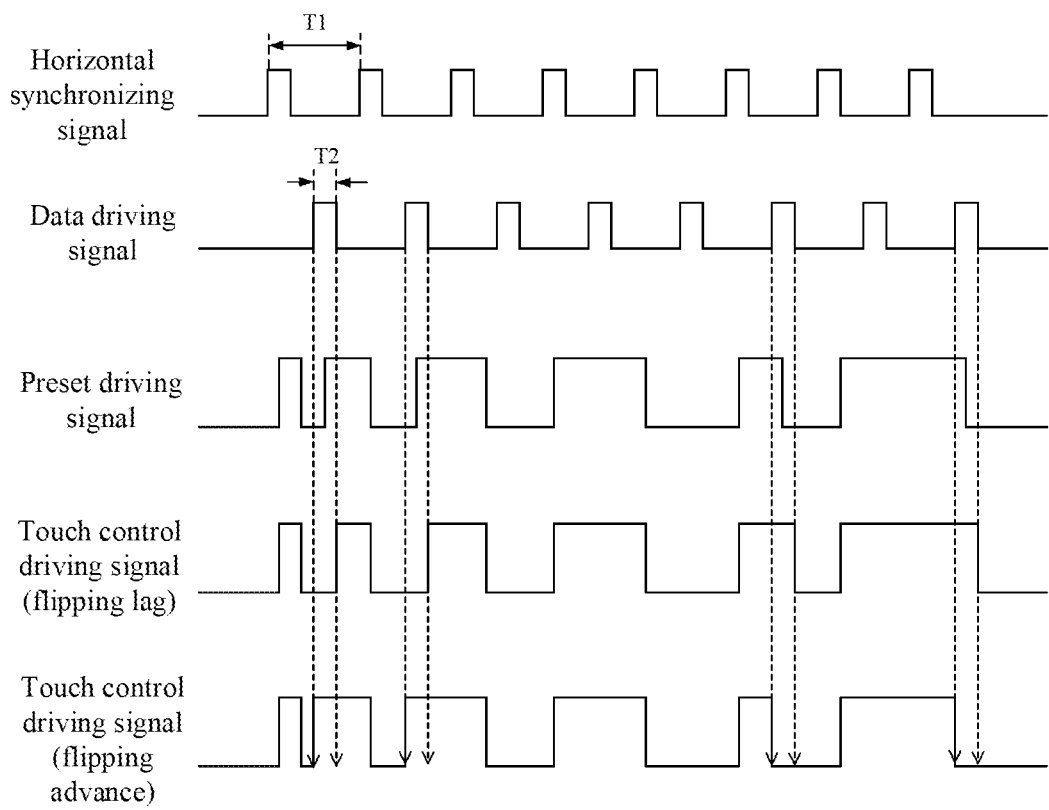
FIG. 5 is a schematic diagram of a touch control driving signal when the touch control driving signal is a spread spectrum signal.

In a case that the frequency of the touch control driving signal is variable, for example, the touch control driving signal is a spread spectrum signal, in an example of FIG. 5, a horizontal synchronizing signal is shown in the 1st row, and one row of pixel circuits of the display screen is driven during one period T1 of the horizontal synchronizing signal, so that data of the row of pixel circuits is updated. A data driving signal is shown in the 2nd row. In a case that the row of pixel circuits is turned on, each pixel circuit in this row receives the data driving signal simultaneously, and the data driving signal is used to drive a data line, so as to apply a voltage signal to each pixel circuit in this row A period of time during which the voltage signal on the date line is written into the pixel driving circuits is a pixel update interval. It should be understood that one pixel update interval T2 in FIG. 5 is a pixel update interval of one row of pixel circuits.

As shown in FIG. 5, a preset driving signal is shown in the 3rd row, a frequency of the preset driving signal is different from that of the data driving signal, and a flipping time of the preset voltage signal is located within the pixel update interval, and thus the influence on data update of the pixel circuits is caused. For this reason, when the flipping time of the preset driving signal is located within the pixel update interval, the flipping time of the preset driving signal can be adjusted to a start time or an end time of the pixel update interval to obtain the touch control driving signal.

The touch control driving signals output by the touch control chip are shown in the 4th and 5th row of FIG. 5, where the flipping time of the preset driving signal that is within the pixel update interval is adjusted to an end time of the pixel update interval T2, and the touch control driving signal shown in the 4th row can be obtained; and the flipping time of the preset driving signal that is within the pixel update interval is adjusted to a start time of the pixel update interval T2, and the touch control driving signal shown in the 5th row can be obtained.

It can be seen that the touch control driving signals obtained in those manners are constant values within the pixel update interval T2, so that no interference to the pixel circuits is caused.

FIG. 2 to FIG. 5 show only the cases that there is one pixel update interval during one period T1 of the horizontal synchronizing signal. When there are multiple pixel update intervals during one period T1 of the horizontal synchronizing signal, for example, in a case that the display screen includes three sub-pixels of RGB or two of them, there are three or two pixel update intervals during the period T1. In this case, an adjustment manner for a preset driving signal within each pixel update interval is the same as the foregoing shown adjustment manners, which will not be described redundantly herein for brevity.

It can be seen from FIG. 2 to FIG. 5 that no matter whether the flipping time triggered by a rising edge of the touch control driving signal is located within the pixel update interval of the pixel circuits or the flipping time triggered by a falling edge of the touch control driving signal is located within the pixel update interval, the foregoing manners can be adopted to adjust the flipping time, and the flipping time is adjusted to the start time or the end time of the pixel update interval. Part of the touch control driving signal that is located outside the pixel update interval is output in a predetermined waveform.

In the embodiments of the present application, the pixel update interval of the display screen can be provided by a supplier of the display screen, or can be obtained by self-testing. For example, in a process of testing the pixel update interval, touch control driving signals having different phases can be continuously output, and a position of the pixel update interval is determined through the interference situation presented by the display screen. When obvious interference is present on the display screen, it can be determined that a flipping time of a touch control driving signal output at this moment is located within a pixel update interval of the display screen. Therefore, the pixel update interval of the display screen can be obtained by gradual testing in this way.

Figure 6:
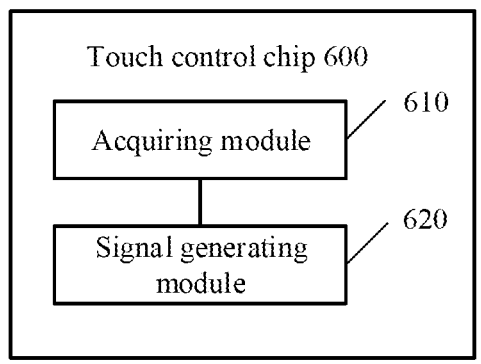
FIG. 6 is a schematic block diagram of a touch control chip according to an embodiment of the present application.

The present application further provides a touch control chip, and as shown in FIG. 6, a touch control chip 600 includes:

an acquiring module 610 configured to acquire a pixel update interval of a pixel circuit in a display screen, the pixel update interval being a time interval during which the pixel circuit receives a data driving signal; and a signal generating module 620 configured to generate a touch control driving signal of a touch control screen according to the pixel update interval, part of the touch control driving signal that is located within the pixel update interval being a constant value.

In an implementation manner, a flipping time of the touch control driving signal is a start time of the pixel update interval, or an end time of the pixel update interval, or is located within a time interval outside the pixel update interval.

In an implementation manner, the signal generating module 620 is specifically configured to: acquire a preset driving signal; and generate the touch control driving signal based on the preset driving signal.

In an implementation manner, the signal generating module 620 is specifically configured to: adjust a flipping time of the preset driving signal to a start time or an end time of the pixel update interval when the flipping time of the preset driving signal is located within the pixel update interval, so as to obtain the touch control driving signal.

In an implementation manner, a frequency of the touch control driving signal is the same as a frequency of the data driving signal, or a frequency of the touch control driving signal is different from a frequency of the data driving signal, or the touch control driving signal is a spread spectrum signal.

In an implementation manner, a frequency of the touch control driving signal is the same as a frequency of the data driving signal, and the signal generating module 620 is specifically configured to: adjust a phase of the preset driving signal when a flipping time of the preset driving signal is located within the pixel update interval, so as to obtain the touch control driving signal.

The present application further provides an electronic device, which includes the touch control chip 600 shown in FIG. 6.

It should be noted that, under a premise of no conflict, various embodiments and/or technical features in the various embodiments described in the present application may be combined with each other arbitrarily, and the technical solutions obtained after the combination should also fall within the protection scope of the present application.

In the system, apparatus, and method disclosed in the embodiments of the present application may be implemented in another manner. For example, some features of the method embodiments described above can be ignored or not implemented. The apparatus embodiments described above are merely exemplary. The division of the units is merely a logic function division, other division manners may exist in practical implementation. A plurality of units or components may be combined or integrated to another system. In addition, coupling between various units or coupling between various components may be direct coupling or indirect coupling, and the foregoing coupling includes a connection in electrical, mechanical or other forms.

A person skilled in the art may clearly understand that, for convenience and simplicity of description, the specific working processes and the achieved technical effects of the apparatus and the device described above may refer to corresponding processes and technical effects in the foregoing method embodiments, which will not be described redundantly herein.

It should be understood that the specific examples in the embodiments of the present application are only to help those skilled in the art to better understand the embodiments of the present application, but not to limit the scope of the embodiments of the present application. Various modifications and variations which fall within the protection scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for transmitting a touch control driving signal, comprising:
   acquiring a pixel update interval of a pixel circuit in a display screen, the pixel update interval being a time interval during which the pixel circuit receives a data driving signal; and
   generating a touch control driving signal of a touch control screen according to the pixel update interval, part of the touch control driving signal that is located within the pixel update interval being a constant value;
   wherein the generating the touch control driving signal of the touch control screen according to the pixel update interval comprises:
   acquiring a preset driving signal; and
   generating the touch control driving signal based on the preset driving signal.

2. The method according to claim 1, wherein a flipping time of the touch control driving signal is a start time of the pixel update interval, or an end time of the pixel update interval, or is located within a time interval outside the pixel update interval.

3. The method according to claim 1, wherein the generating the touch control driving signal based on the preset driving signal comprises:
   adjusting a flipping time of the preset driving signal to a start time or an end time of the pixel update interval when the flipping time of the preset driving signal is located within the pixel update interval, so as to obtain the touch control driving signal.

4. The method according to claim 3, wherein a frequency of the touch control driving signal is the same as a frequency of the data driving signal, or a frequency of the touch control driving signal is different from a frequency of the data driving signal, or the touch control driving signal is a spread spectrum signal.

5. The method according to claim 1, wherein a frequency of the touch control driving signal is the same as a frequency of the data driving signal, and the generating the touch control driving signal based on the preset driving signal comprises:
   adjusting a phase of the preset driving signal when a flipping time of the preset driving signal is located within the pixel update interval, so as to obtain the touch control driving signal.

6. A touch control chip, comprising:
   an acquiring module configured to acquire a pixel update interval of a pixel circuit in a display screen, the pixel update interval being a time interval during which the pixel circuit receives a data driving signal; and
   a signal generating module configured to generate a touch control driving signal of a touch control screen according to the pixel update interval, part of the touch control driving signal that is located within the pixel update interval being a constant value;
   wherein the signal generating module is specifically configured to:
   acquire a preset driving signal; and
   generate the touch control driving signal based on the preset driving signal.

7. The touch control chip according to claim 6, wherein a flipping time of the touch control driving signal is a start time of the pixel update interval, or an end time of the pixel update interval, or is located within a time interval outside the pixel update interval.

8. The touch control chip according to claim 6, wherein the signal generating module is specifically configured to:
   adjust a flipping time of the preset driving signal to a start time or an end time of the pixel update interval when the flipping time of the preset driving signal is located within the pixel update interval, so as to obtain the touch control driving signal.

9. The touch control chip according to claim 8, wherein a frequency of the touch control driving signal is the same as a frequency of the data driving signal, or a frequency of the touch control driving signal is different from a frequency of the data driving signal, or the touch control driving signal is a spread spectrum signal.

10. The touch control chip according to claim 6, wherein a frequency of the touch control driving signal is the same as a frequency of the data driving signal, and the signal generating module is specifically configured to:
    adjust a phase of the preset driving signal when a flipping time of the preset driving signal is located within the pixel update interval, so as to obtain the touch control driving signal.

11. An electronic device, comprising a touch control chip, wherein the touch control chip comprises:
    an acquiring module configured to acquire a pixel update interval of a pixel circuit in a display screen, the pixel update interval being a time interval during which the pixel circuit receives a data driving signal; and
    a signal generating module configured to generate a touch control driving signal of a touch control screen according to the pixel update interval, part of the touch control driving signal that is located within the pixel update interval being a constant value;
    wherein the signal generating module is specifically configured to:
    acquire a preset driving signal; and
    generate the touch control driving signal based on the preset driving signal.

12. The electronic device according to claim 11, wherein a flipping time of the touch control driving signal is a start time of the pixel update interval, or an end time of the pixel update interval, or is located within a time interval outside the pixel update interval.

13. The electronic device according to claim 11, wherein the signal generating module is specifically configured to:
    adjust a flipping time of the preset driving signal to a start time or an end time of the pixel update interval when the flipping time of the preset driving signal is located within the pixel update interval, so as to obtain the touch control driving signal.

14. The electronic device according to claim 13, wherein a frequency of the touch control driving signal is the same as a frequency of the data driving signal, or a frequency of the touch control driving signal is different from a frequency of the data driving signal, or the touch control driving signal is a spread spectrum signal.

15. The electronic device according to claim 11, wherein a frequency of the touch control driving signal is the same as a frequency of the data driving signal, and the signal generating module is specifically configured to:

adjust a phase of the preset driving signal when a flipping time of the preset driving signal is located within the pixel update interval, so as to obtain the touch control driving signal.

* * * * *